US012583086B2

(12) United States Patent
Frank et al.

(10) Patent No.: US 12,583,086 B2
(45) Date of Patent: Mar. 24, 2026

(54) DOSING LEVER FOR FASTENER DRIVING TOOL

(71) Applicant: Illinois Tool Works Inc., Glenview, IL (US)

(72) Inventors: Adam J. Frank, Gurnee, IL (US); Ninad C. Maniar, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 19/069,894

(22) Filed: Mar. 4, 2025

(65) Prior Publication Data

US 2025/0196304 A1 Jun. 19, 2025

Related U.S. Application Data

(62) Division of application No. 18/056,119, filed on Nov. 16, 2022, now Pat. No. 12,251,809.

(60) Provisional application No. 63/282,400, filed on Nov. 23, 2021.

(51) Int. Cl.

*B25C 1/18* (2006.01)
*B25C 1/08* (2006.01)
*B25C 5/10* (2006.01)

(52) U.S. Cl.

CPC .................. *B25C 1/18* (2013.01); *B25C 1/08* (2013.01); *B25C 5/10* (2013.01)

(58) Field of Classification Search

CPC .................................... B25C 1/08; B25C 1/18
USPC ........................................................ 227/9–11
See application file for complete search history.

(56) References Cited

U.S. PATENT DOCUMENTS 4,403,722 A 9/1983 Nikolich
4,483,280 A 11/1984 Nikolich
4,483,474 A 11/1984 Nikolich
6,378,288 B1 4/2002 Towfighi et al.
7,654,429 B2 2/2010 Shea et al.
8,302,831 B2 11/2012 Taylor et al.
8,939,339 B2 1/2015 Vanstaan et al.
9,802,303 B2 10/2017 Vanstaan et al.
10,598,377 B2 3/2020 Crawford et al.
2007/0034659 A1* 2/2007 Moeller .................... B25C 1/08 227/8
2007/0074706 A1 4/2007 Wagdy et al.
2007/0251967 A1 11/2007 Taylor et al.
2008/0000451 A1 1/2008 Shea et al.
2009/0090760 A1 4/2009 Ohmori
2010/0096429 A1 4/2010 Ho
2010/0176177 A1 7/2010 Tanaka
2011/0049212 A1* 3/2011 Taylor ....................... B25C 1/08 227/9
2011/0248063 A1 10/2011 Taylor et al.
2012/0267417 A1 10/2012 Vanstaan et al.
2014/0175143 A1 6/2014 Vanstaan et al.

(Continued)

OTHER PUBLICATIONS

International Search Report and Written Opinion from International Application No. PCT/US2022/080022, mailed on Feb. 24, 2023 (11 pages).

*Primary Examiner* — Joshua G Kotis
(74) *Attorney, Agent, or Firm* — Neal, Gerber & Eisenberg LLP

(57) ABSTRACT

A combustion powered fastener driving tool including a dosing lever that reduces the likelihood of causing inconsistent amounts of fuel to be dispensed by the fuel supply assembly of the tool.

5 Claims, 11 Drawing Sheets

(56) References Cited

U.S. PATENT DOCUMENTS

| | | | | |
|---|---|---|---|---|
| 2014/0367441 | A1* | 12/2014 | Liu | B25C 1/08 227/8 |
| 2021/0053198 | A1 | 2/2021 | Popovich et al. | |

* cited by examiner

DOSING LEVER FOR FASTENER DRIVING TOOL

PRIORITY

This application is a divisional of and claims priority to and the benefit of U.S. patent application Ser. No. 18/056,119, which was filed Nov. 16, 2022, which claims priority to and the benefit of U.S. Provisional Patent Application No. 63/282,400, filed Nov. 23, 2021, the entire contents of each of which are incorporated herein by reference in their entirety.

FIELD

The present disclosure relates to fastener driving tools specifically, to combustion powered fastener driving tools with improved dosing levers.

BACKGROUND

Powered fastener driving tools use one of several types of power sources to carry out a fastener driving cycle to drive a fastener (such as a nail or a staple) into a workpiece. More specifically, a powered fastener driving tool uses a power source to force a driving assembly, such as a piston carrying a driver blade, through a cylinder from a pre-firing position to a firing position. As the driving assembly moves to the firing position, the driver blade travels through a nosepiece, which guides the driver blade to contact a fastener housed in the nosepiece. Continued movement of the driving assembly through the cylinder toward the firing position forces the driver blade to drive the fastener from the nosepiece into the workpiece. The driving assembly is then forced back to the pre-firing position in a way that depends on the tool's construction and power source. A fastener advancing device forces another fastener from a magazine into the nosepiece, and the tool is ready to fire again.

Combustion powered fastener driving tools are one type of powered fastener driving tools that use a small internal combustion assembly as their power source. To operate various known combustion powered fastener driving tools, an operator depresses a workpiece contact element of the tool onto a workpiece. This moves the workpiece contact element from an extended position to a retracted position, which causes one or more mechanical linkages to cause: (1) a valve sleeve to move to a sealed position to seal a combustion chamber that is in fluid communication with the cylinder; and (2) a fuel supply assembly to dispense fuel from a fuel cell into the (now sealed) combustion chamber.

The operator then pulls the trigger to actuate a trigger switch, thereby causing a spark generator to deliver a spark and ignite the fuel/air mixture in the combustion chamber to start the fastener driving cycle. This generates high-pressure combustion gases that expand and act on the piston to force the driving assembly to move through the cylinder from the pre-firing position to the firing position, thereby causing the driver blade to contact a fastener housed in the nosepiece and drive the fastener from the nosepiece into the workpiece.

The fuel supply assembly is configured to dispense only a desired amount of fuel to the combustion chamber for each combustion event. The amount of fuel needs to be carefully monitored to provide the desired combustion in a fuel efficient manner to prolong the working life of the fuel cell. Accordingly, various combustion powered fastener driving tools include a fuel supply assembly including a dosing lever that engages with certain other components of the fuel supply assembly and the tool before each combustion cycle to dispense the desired dose of fuel from the fuel cell.

Actuation of the tool causes the dosing lever to engage with certain other components of the tool and the fuel supply assembly to dispense the desired dose of fuel for the next combustion cycle. Certain known fuel supply assemblies of combustion powered fastener driving tools include dosing levers that can, in some circumstances, cause inconsistent amounts of fuel to be dispensed by the fuel supply assembly. For example, when certain known combustion powered fastener driving tools are actuated in relatively cold weather, the dosing lever can get stuck in an undesired position or otherwise cause undesirable engagement with one or more other components of the tool such that the fuel supply assembly dispenses inconsistent doses of fuel. There is a need for a combustion powered fastener driving tool with a fuel supply assembly that provides more consistent and stable doses of fuel in such circumstances.

SUMMARY

Various embodiments of the present disclosure provide a dosing lever for a combustion powered fastener driving tool that solves the above problems in part by eliminating or reducing the likelihood of causing inconsistent amounts of fuel to be dispensed by the fuel supply assembly.

In various example embodiments of the present disclosure, the fastener driving tool includes a housing, a fastener driving assembly at least partially positioned in, connected to, and supported by the housing, a handle assembly connected to the housing, a fastener magazine assembly connected to the housing and the handle assembly, a workpiece contact assembly connected to the housing, and a fuel supply assembly at least partially positioned in, supported by, and connected to the housing. The fuel supply assembly includes a dosing lever that is configured, shaped, and sized to be better engaged by a combustion chamber ring during actuation of the dosing lever and dispensing of fuel for combustion of the fastener driving tool.

Other objects, features, and advantages of the present disclosure will be apparent from the following detailed disclosure and accompanying drawings.

DETAILED DESCRIPTION

Figure 1:
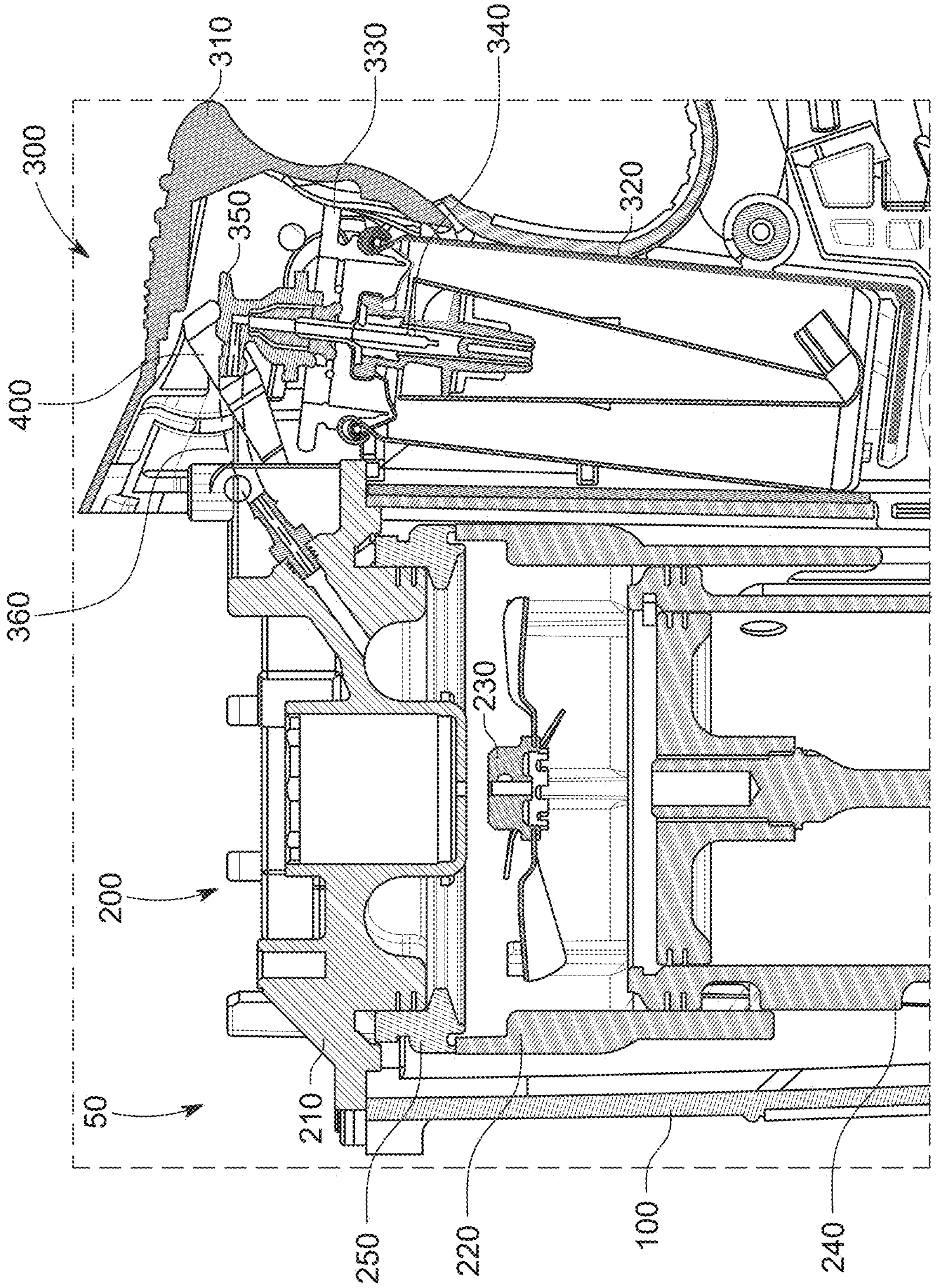
FIG. 1 (Prior Art)
FIG. 1 is an enlarged fragmentary cross-sectional view of part of a known fastener driving tool showing the fuel supply assembly mounted in the housing and showing part of the fastener driving assembly.
Figure 2:
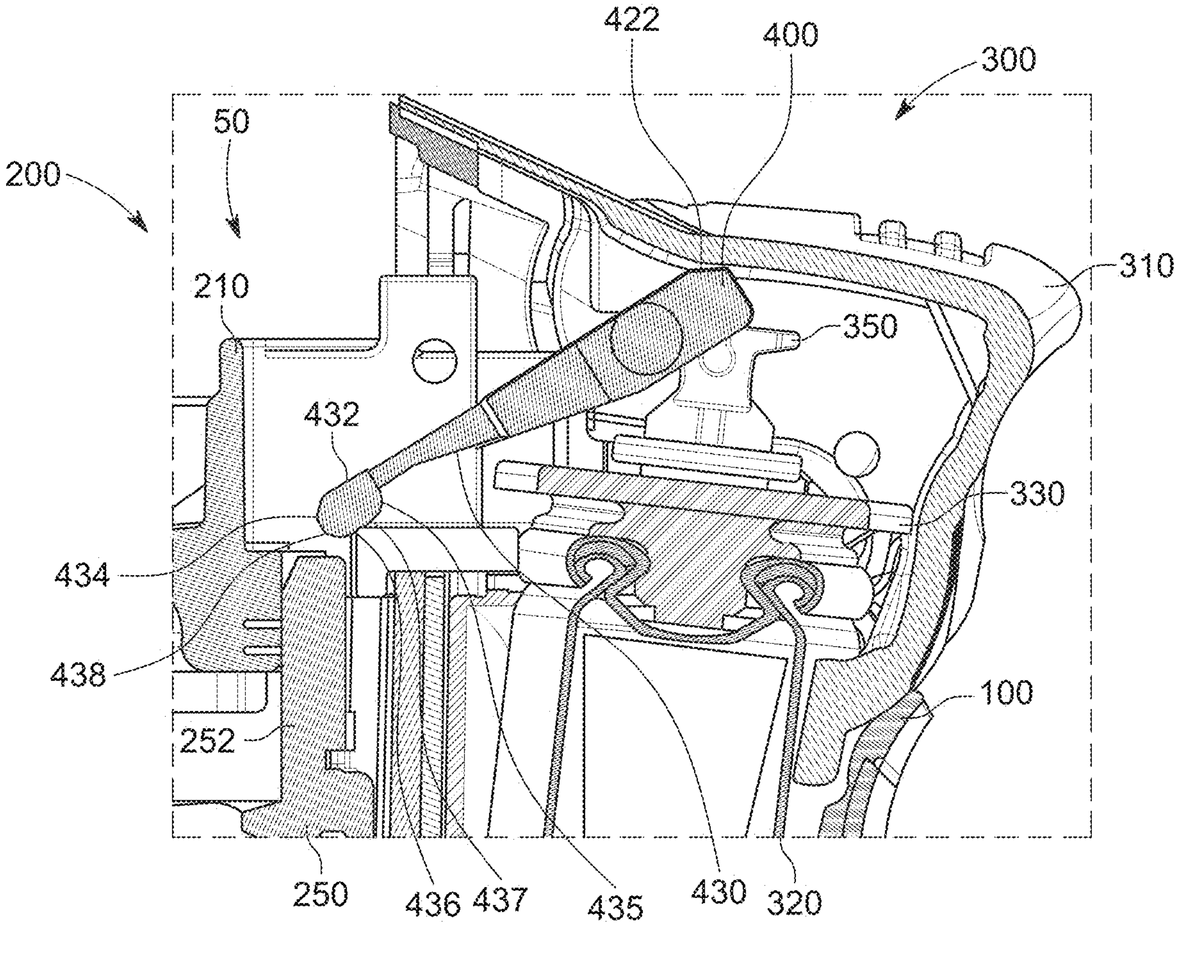
FIG. 2 (Prior Art)
FIG. 2 is an enlarged fragmentary cross-sectional view of a part of the known fuel supply assembly of the fastener driving tool of FIG. 1, showing the dosing lever in the non-actuated position.
Figure 3:
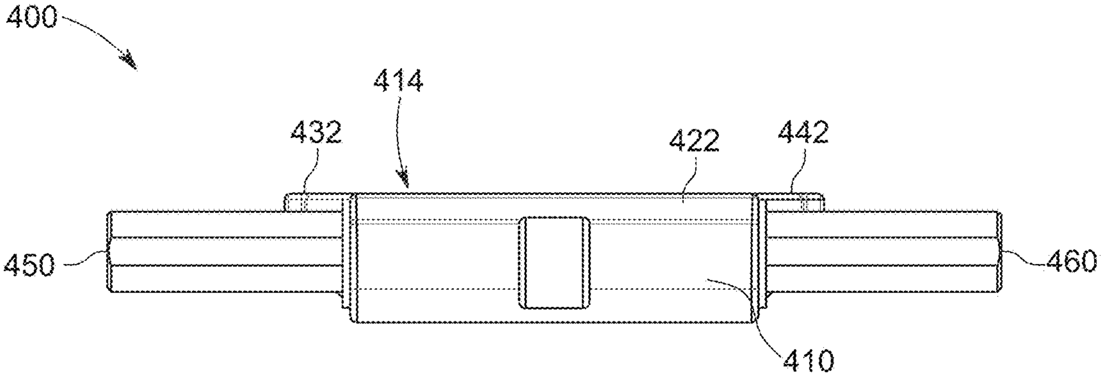
FIG. 3 (Prior Art)
FIG. 3 is an enlarged end perspective view of the known dosing lever of the fastener driving tool of FIG. 1.
Figure 4:
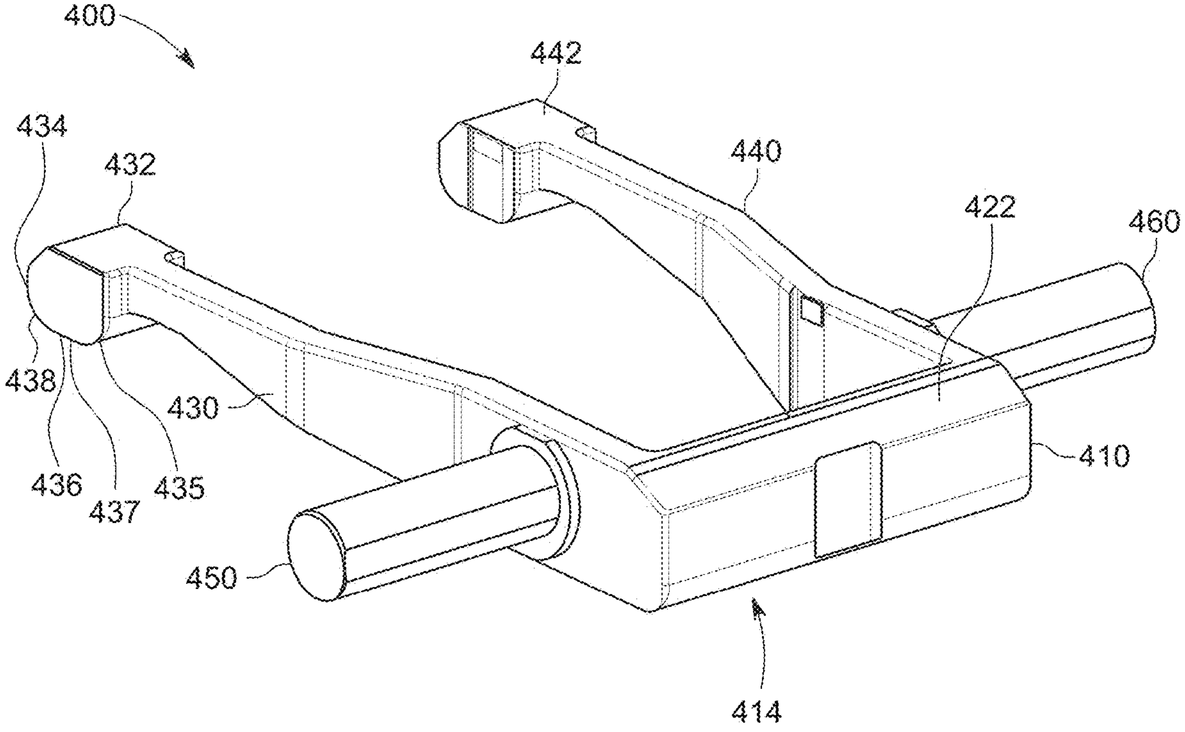
FIG. 4 (Prior Art)
FIG. 4 is an enlarged elevated perspective view of the known dosing lever of the fastener driving tool of FIG. 1.
Figure 5:
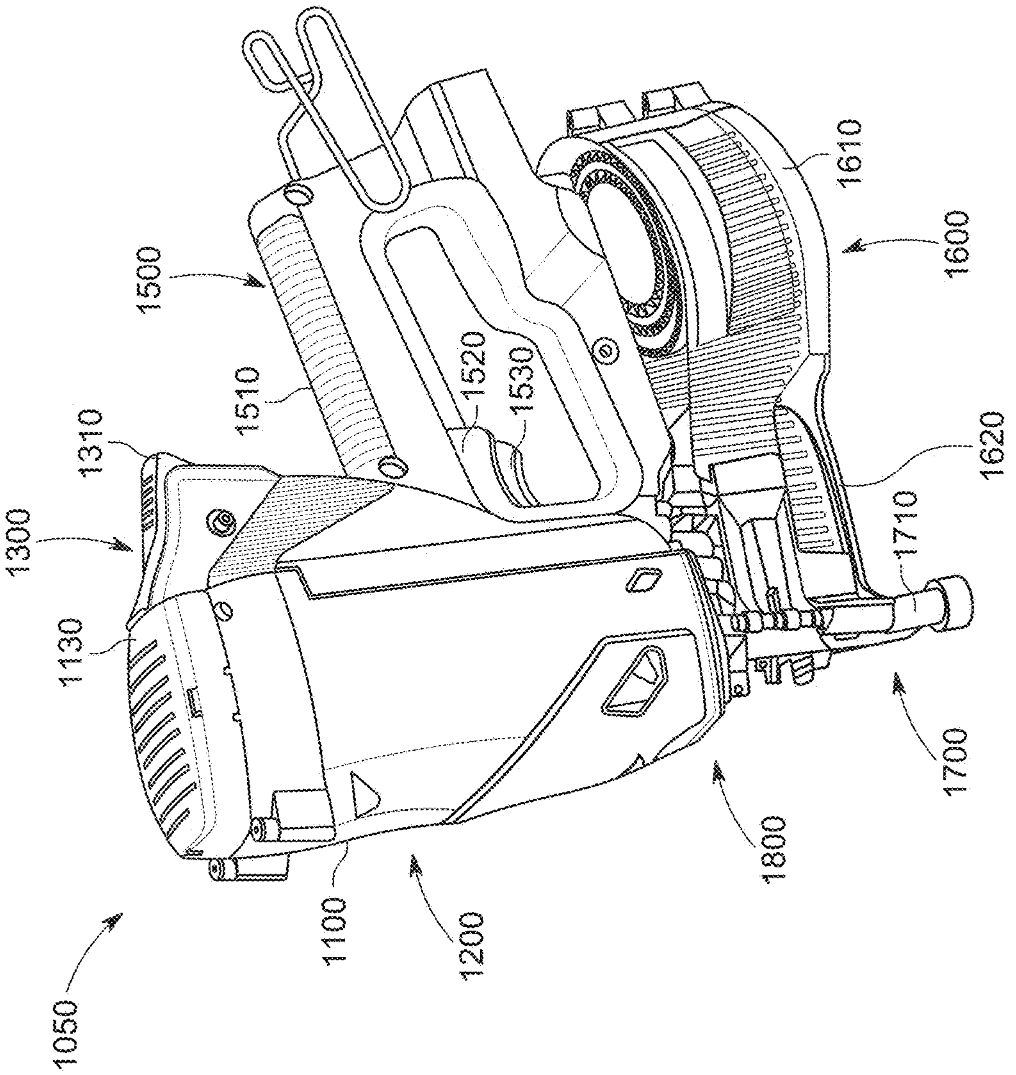
FIG. 5 is a perspective view of a fastener driving tool of one example embodiment of the present disclosure.
Figure 6:
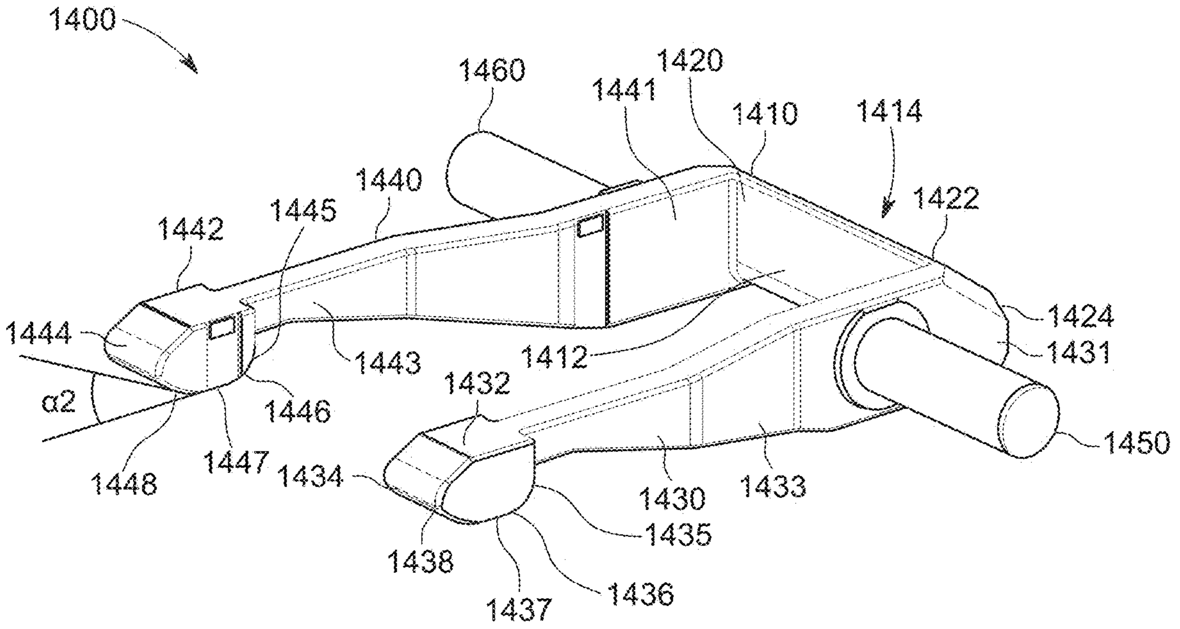
FIG. 6 is an enlarged elevated perspective view of the dosing lever of the fastener driving tool of FIG. 5.
Figure 7:
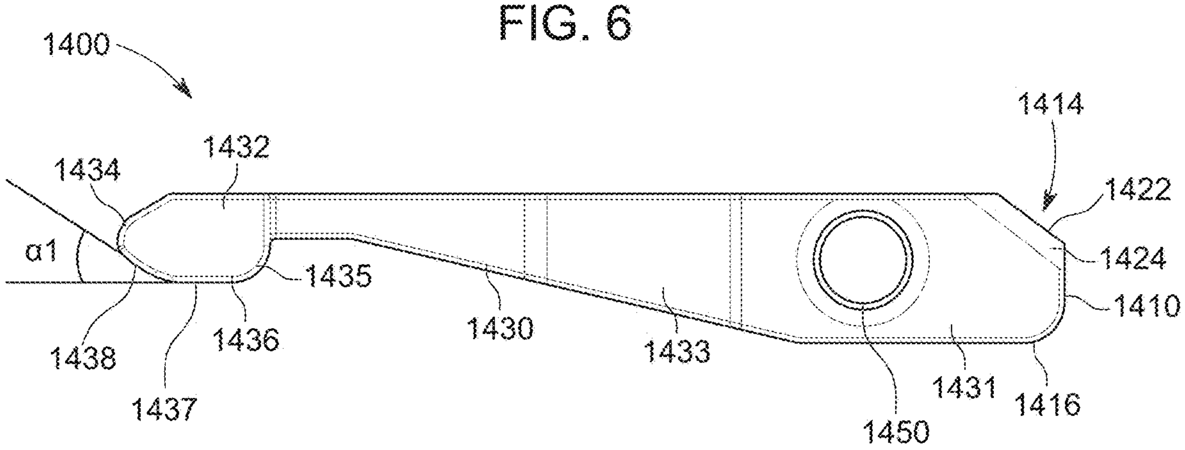
FIG. 7 is an enlarged side view of the dosing lever of FIG. 6.
Figure 8:
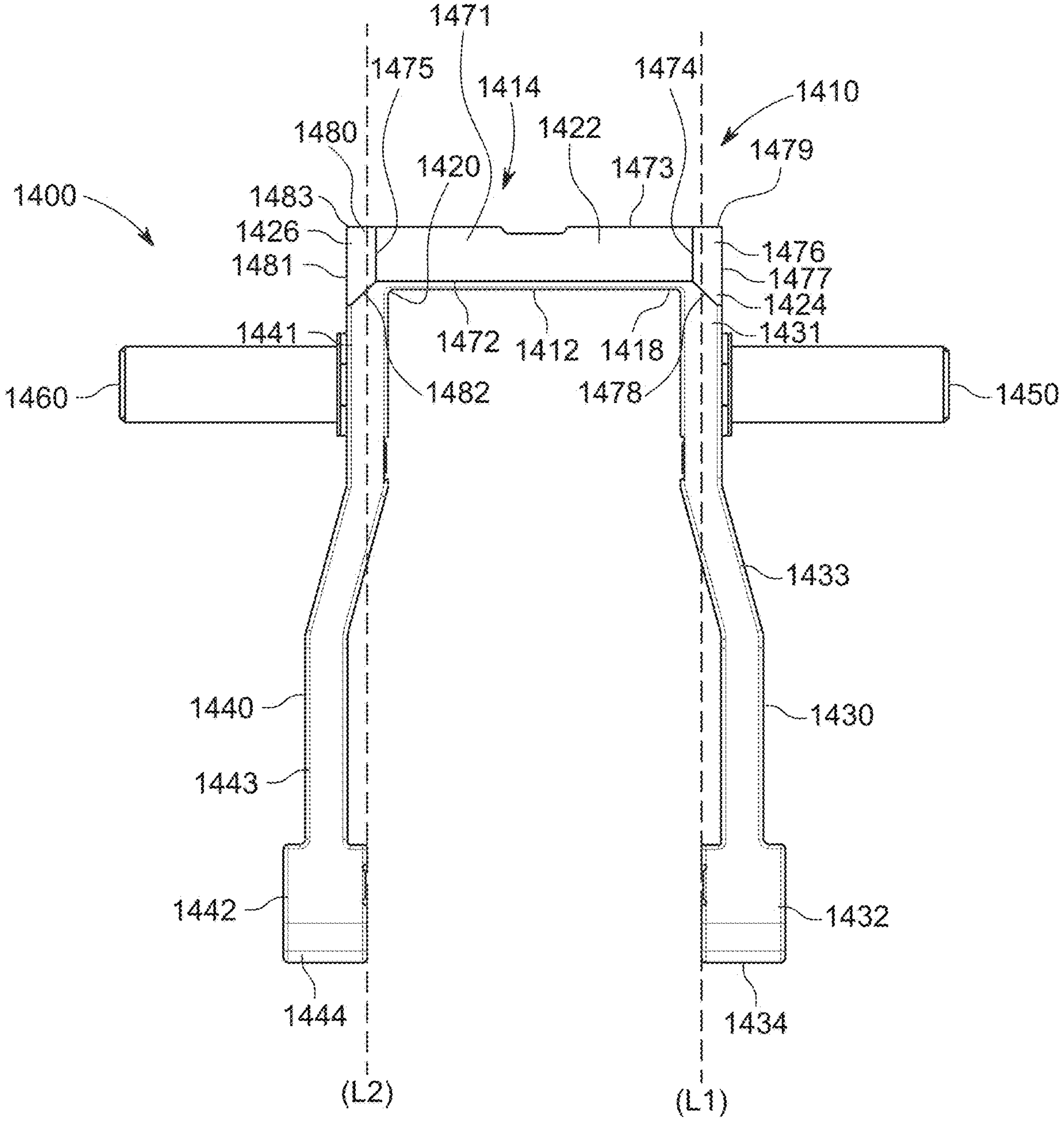
FIG. 8 is an enlarged top view of the dosing lever of the fastener driving tool of FIG. 6.
Figure 9:
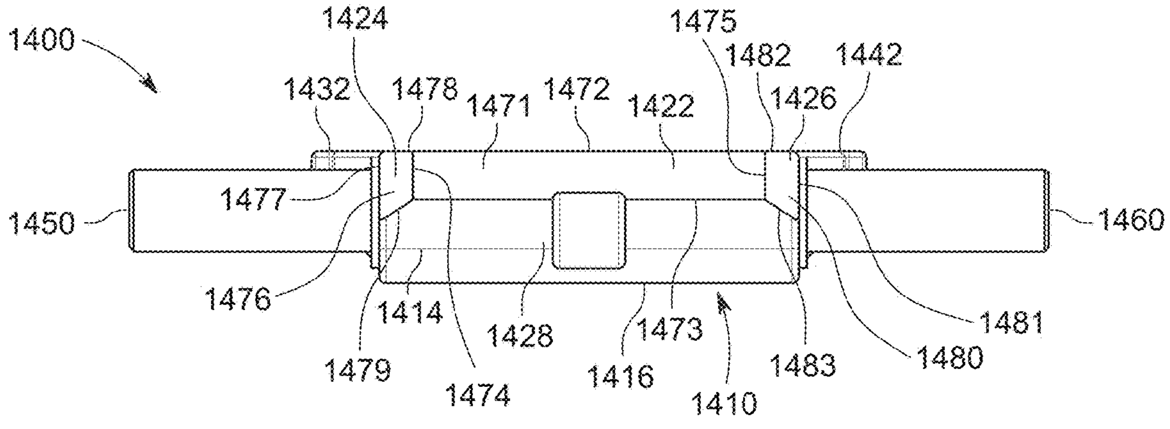
FIG. 9 is an enlarged end view of the dosing lever of FIG. 6.
Figure 10:
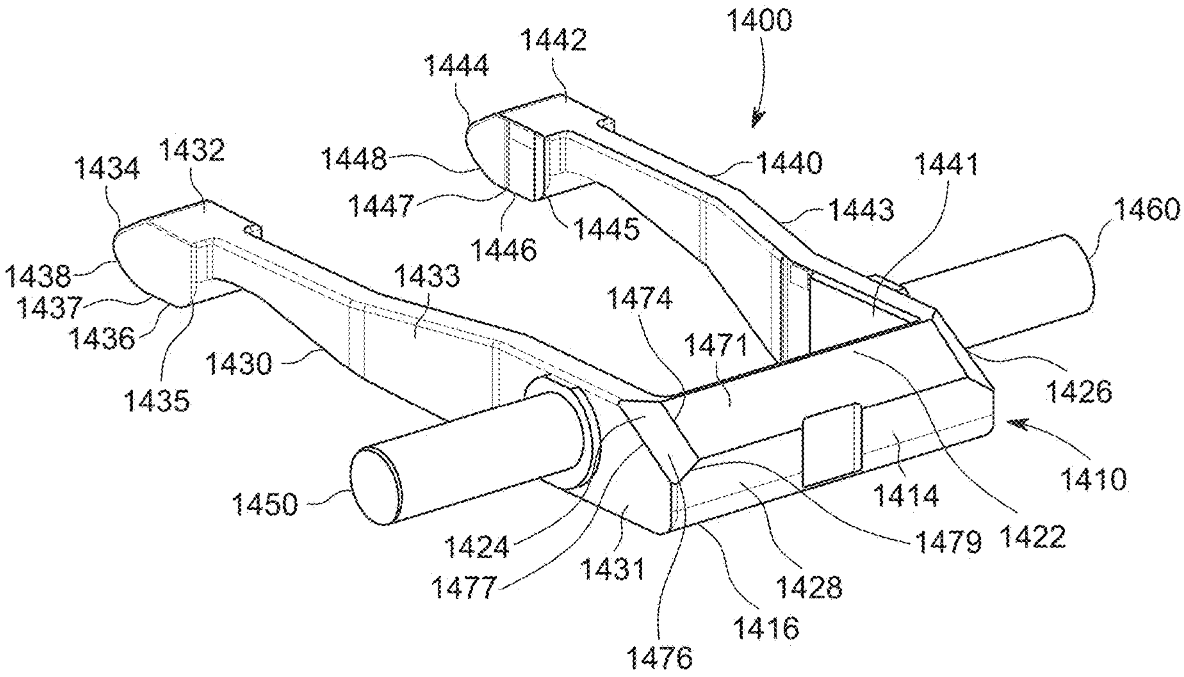
FIG. 10 is an enlarged perspective view of the dosing lever of FIG. 6.

While the systems, devices, and methods described herein may be embodied in various forms, the drawings show, and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

For a better understanding of the present disclosure, an example known combustion powered fastener driving tool is first partially described. FIGS. 1, 2, 3, and 4 illustrate an example known combustion powered fastener driving tool 50 (that is sometimes referred to herein as "known tool" for brevity). FIGS. 1, 2, 3, and 4 show selected components of the example known tool 50 including: (1) a housing 100; (2) a fastener driving assembly 200 partially positioned in, supported by, and connected to the housing 100; and (3) a fuel supply assembly 300 partially positioned in, supported by, and connected to the housing 100.

In the illustrated known fastener driving tool 50, the fastener driving assembly 200 includes, in part: (1) a cylinder head 210; (2) a combustion chamber 220 suitably connected to the cylinder head 210; (3) a fan motor 230 suitably mounted to the cylinder head 210 and projecting into the combustion chamber 220; (4) a sleeve 240 suitably connected to the combustion chamber 220; and (5) a combustion chamber ring 250 suitably connected to an upper portion of the combustion chamber 220 and the cylinder head 210.

In the illustrated known fastener driving tool 50, the fuel supply assembly 300 includes, in part: (1) a fuel cell door 310 pivotally connected to the housing 100; (2) a fuel cell 320 receivable in and at least partially supported by the housing 100; (3) a fuel cell adapter 330 suitably connected to the fuel cell 320; (4) a fuel cell metering valve 340 connected to the fuel cell adapter 330 and extending into a portion of the fuel cell 320; (5) a fuel cell receiving block 350 mounted on, connected to, and in fluid communication with the fuel cell adapter 330; (6) a fuel line 360 suitably connected between the fuel cell receiving block 350 and the cylinder head 210 to define a fuel pathway between the fuel cell 320 and the combustion chamber 220; and (7) a dosing lever 400 pivotally supported by the cylinder head 210 and engaged to the fuel cell receiving block 350. The fuel cell 320 and the adapter 330 are described as part of the fuel supply assembly for ease of description but are separate components receivable by the tool 50.

In the illustrated known fastener driving tool 50, the dosing lever 400 includes: (1) a dosing lever body 410; (2) a first dosing lever leg 430 connected to and extending from a first end of the dosing lever body 410; (3) a second dosing lever leg 440 connected to and extending from a second end of the dosing lever body 410; (4) a first lever pivot 450 pin connected to and extending from the first dosing lever leg 430; and (5) a second lever pivot 460 pin connected to and extending from the second dosing lever leg 440.

In the illustrated known tool 50, the first dosing lever leg 430 includes a foot 432 that includes: (1) a toe 434; (2) a heel 435; and (3) a sole 436 extending between and connected to the toe 434 and the heel 435. The sole 436 defines a first contact surface 437 and the toe 434 defines a second contact surface 438. In the known tool 50, the second contact surface 438 has a completely curved and arcuate profile (having a radius of curvature of about 0.08 inches (0.2032 cms)) configured to engage one of the ring fingers 252 of the combustion chamber ring 250. This engagement between the ring fingers 252 of the combustion chamber ring 250 and the foot 432 causes an actuation of the known dosing lever 400. For brevity, only the foot 432 of the first dosing lever leg 430 is described herein; however, it will be understood that the second dosing lever leg 440 includes a foot 442 that is substantially identical to the foot 432.

In certain circumstances, actuation of the known dosing lever 400 can cause the curved and arcuate profile of the second contact surface 438 of the foot 432 to temporarily stick to the ring fingers 252 of the combustion chamber ring 250. In certain circumstances, this sticking between the known dosing lever 400 and the combustion chamber ring 250 can cause the fuel supply assembly 300 to dispense an improper amount of fuel to the fastener driving assembly 200. As a result, the improper amount of fuel delivered to the fastener driving assembly 200 can cause variation in the combustion and operation of the known fastener driving tool 50. The apparatus of the present disclosure overcomes these problems.

In the illustrated known fastener driving tool 50, the dosing lever body 410 includes a fuel cell door facing section 414 that includes a beveled portion 422 along the width of the fuel cell door facing section 414. However, the dosing lever body 410 of the dosing lever 400 of this illustrated known fastener driving tool 50 can interact with the fuel cell door 310 as the dosing lever body 410 pivots between the non-actuated position and the actuated position. This interaction between the dosing lever 400 and the fuel cell door 310 can inhibit movement during actuation of the dosing lever 400 such that the fuel supply assembly 300 does not dispense a full dose of fuel to the fastener driving assembly 200. In certain circumstances, for each actuation cycle of the known dosing lever 400, the interaction between the dosing lever 400 and the fuel cell door 310 causes the fuel supply assembly 300 to deliver a different amount of fuel to the fastener driving assembly 200. As a result, the variation of fuel delivered to the fastener driving assembly 200 can cause variation in the combustion and operation of the known fastener driving tool 50. The apparatus of the present disclosure overcomes these problems.

FIGS. 5, 6, 7, 8, 9, 10, 11, 12, 13, and 14 illustrate the combustion powered fastener driving tool of one example embodiment of the present disclosure that is generally indicated by numeral 1050 (that is sometimes referred to herein as the "tool" for brevity). The illustrated example shows selected components of the tool 1050 during actuation of the tool 1050 to drive a fastener (not shown) into a workpiece. Other components of the tool 1050 not discussed herein will be readily understood by those skilled in the art.

The illustrated example tool 1050 includes, in part: (1) a housing 1100; (2) a fastener driving assembly 1200 at least partially positioned in, supported by and connected to the housing 1100; (3) a fuel supply assembly 1300 partially positioned in, supported by, and connected to the housing 1100; (4) a handle assembly 1500 supported by and connected to the housing 1100; (5) a fastener magazine assembly 1600 supported by and connected to the housing 1100 and the handle assembly 1500; (6) a workpiece contact assembly 1700 supported by and connected to the housing 1100; and (7) a nosepiece assembly 1800 supported by and connected to a lower portion of the housing 1100. The illustrated example combustion powered fastener driving tool 1050 in this example is known in the industry as is a mid-range combustion powered fastener driving tool; however, it should be understood that the present disclosure can also be applied to what is known in the industry as framing combustion powered fastener driving tools, what is known in the industry as trim combustion powered fastener driving tools, and other combustion powered tools.

The housing 1100 includes, in part: (1) a first wall 1110; (2) a second wall 1120 opposite of the first wall; and (3) a housing cap 1130 suitably connected to the first and second walls 1110 and 1120 of the housing 1100. The housing 1100 thus provides a suitable protective enclosure for the fastener driving assembly 1200, parts of the fuel supply assembly 1300, and other components of the tool 1050.

The fastener driving assembly 1200 includes, in part: (1) a cylinder head 1210 connected to the housing cap 1130; (2) a combustion chamber 1220 suitably connected to the cylinder head 1210; (3) a fan motor 1230 suitably mounted to the cylinder head 1210 and projecting into the combustion chamber 1220; (4) a cylinder 1240 suitably connected to the combustion chamber 1220; (5) a driving blade 1250 suitably connected to the cylinder 1240; (6) a piston 1260 positioned in the cylinder 1240 and suitably connected to the driving blade 1250; and (7) a combustion chamber ring 1270 positioned between the combustion chamber 1220 and the cylinder head 1210. The combustion chamber ring 1270 suitably connects the cylinder head 1210 to an upper portion of the combustion chamber 1220.

The fuel supply assembly 1300 includes, in part: (1) a fuel cell door 1310 pivotally connected to the housing cap 1130 of the housing 1100; (2) a fuel cell receiving assembly 1316 positioned in and at least partially supported by the housing 1100 and configured to receive a removable fuel cell 1320; (3) a fuel cell adapter 1330 suitably connected to the fuel cell 1320; (4) a fuel cell metering valve 1340 connected to the fuel cell adapter 1330 and extending into a portion of the fuel cell 1320; (5) a fuel cell receiving block 1350 connected to and in fluid communication with the fuel cell adapter 1330; (6) a fuel line 1360 suitably connected between the fuel cell receiving block 1350 and the cylinder head 1210 to define a fuel pathway between the fuel cell 1320 and the combustion chamber 1220; and (7) a dosing lever 1400 pivotally supported in the housing 1100 and engaged to the fuel cell receiving block 1350. The dosing lever 1400 is further described below. It should be appreciated that while the fuel cell 1320 and the fuel cell adapter 1330 of the present disclosure are described herein as part of the fuel supply assembly 1300 of the tool 1050 for ease of description, that these components will typically be provided separately from the tool 1050 and insertable in the tool 1050, and thus to a certain extent are not part of the fuel supply assembly 1300, but rather connectable to and operable with the fuel supply assembly 1300 of the tool 1050.

The handle assembly 1500 includes, in part: (1) a gripping portion 1510; (2) a trigger mount 1520 defined on the gripping portion 1510; and (3) a trigger 1530 suitably connected to the trigger mount 1520 via a trigger pin (not shown) such that a portion of the trigger 1530 can move relative to the gripping portion 1510. The handle assembly 1500 is suitably connected to the housing 1100.

The fastener magazine assembly 1600 includes, in part: (1) a fastener channel 1610 configured to hold a plurality of fasteners (e.g., nails, or staples); and (2) a fastener channel 1610 suitably connected to the nosepiece assembly 1800 and to the handle assembly 1500. During operation of the tool 1050, a fastener is delivered, via the fastener channel 1610, to the nosepiece assembly 1800 and driven into the workpiece by the fastener driving assembly 1200.

The workpiece contact assembly 1700 includes, in part, a workpiece contact element 1710 suitably connected to the nosepiece assembly 1800 and to the fastener magazine assembly 1600. The workpiece contact element 1710 contacts the location where the fastener is driven into the workpiece by the tool 1050. The nosepiece assembly 1800 is suitably connected to the fastener magazine assembly 1600 and to the cylinder 1240. The nosepiece assembly 1800 receives a fastener from the fastener channel 1610. During operation of the tool 1050, the piston 1260 is driven downward via the driving blade 1250 in the cylinder 1240, contacts the fastener positioned in the nosepiece assembly 1800 and drives the fastener into the workpiece.

The example dosing lever 1400 of the present disclosure is now further described. FIGS. 6 to 14 illustrate the example dosing lever 1400 of the example fastener driving tool 1050. The dosing lever 1400 includes: (1) a body 1410; (2) a first leg 1430 connected to and extending from the body 1410 along a first longitudinal axis (L1); (3) a second leg 1440 connected to and extending from the body 1410 along a second longitudinal axis (L2); (4) a first lever pivot pin 1450 connected to and extending from the first leg 1430; and (5) a second lever pivot pin 1460 connected to and extending from the second leg 1440.

The body 1410 includes: (1) a leg connection section 1412; (2) a fuel cell door facing section 1414; and (3) a fuel block contact section 1416. The leg connection section 1412 (that is sometimes referred to herein as the "front section") incudes: (1) a first leg connection portion 1418 connected to the first leg 1430; and (2) a second leg connection portion 1420 connected to the second leg 1440. The fuel cell door facing section 1414 (that is sometimes referred to herein as the "rear section") includes: (1) a first beveled portion 1422; (2) a second beveled portion 1424; (3) a third beveled portion 1426; and (4) an upright portion 1428 that connects the fuel cell door facing section 1414 to the fuel block contact section 1416. The fuel block contact section 1416 (that is sometimes referred to herein as the "bottom section") is configured to engage the fuel cell receiving block 1350 upon actuation of the dosing lever 1400.

The first dosing lever leg 1430 includes: (1) a connection portion 1431 suitably connected to the first leg connection portion 1418 of the body 1410; (2) a foot 1432 opposite the connection portion 1431; and (3) a central portion 1433 extending between and connected to the connection portion 1431 and the foot 1432. In the illustrated example embodiment, the first lever pivot pin 1450 is connected to and transversely extends outward from the connection portion 1431 of the first dosing lever leg 1430.

The foot 1432 of the first dosing lever leg 1430 includes: (1) a toe 1434; (2) a heel 1435; and (3) a sole 1436 extending between and connected to the toe 1434 and the heel 1435. In the illustrated example embodiment, the sole 1436 includes a substantially flat surface (within manufacturing tolerances) that defines a first contact surface 1437 of the foot 1432. The toe 1434 includes a sloped surface with respect to the sole 1436 that defines a second contact surface 1438 of the foot 1432. In this illustrated example embodiment, the second contact surface 1438 can be completely flat or can have a slight curvature such as a having a radius of curvature of about 1 inch (2.54 cms). In the illustrated example embodiment, the foot 1432 forms or otherwise defines an angle ($\alpha$1) of approximately 32 degrees between the first contact surface 1437 of the sole 1436 and the second contact surface 1438 of the toe 1434. The foot 1432 thus includes two flat or generally flat separate contact surfaces 1436 and 1438 that function for different purposes as described below.

The second leg 1440 includes: (1) a connection portion 1441 suitably connected to the second leg connection portion 1420 of the body 1410; (2) a foot 1442 opposite the connection portion 1441; and (3) a central portion 1443 extending between the connection portion 1441 and the foot 1442. In the illustrated example embodiment, the second lever pivot pin 1460 is connected to and transversely extends outward from the connection portion 1441 of the second dosing lever leg 1440.

The foot 1442 of the second dosing lever leg 1440 includes: (1) a toe 1444; (2) a heel 1445; and (3) a sole 1446 extending between and connected to the toe 1444 and the heel 1445. In the illustrated example embodiment, the sole 1446 includes a substantially flat surface (within manufacturing tolerances) that defines a first contact surface 1447 of the foot 1442. The toe 1444 includes a sloped surface with respect to the sole 1446 that defines a second contact surface 1448 of the foot 1442. In this illustrated example embodiment, the second contact surface 1448 can be completely flat or can have a slight curvature such as a having a radius of curvature of about 1 inch (2.54 cms). In the illustrated example embodiment, the foot 1442 forms an angle ($\alpha$2) (not shown) that is the same or substantially the same as the angle ($\alpha$1). Angle ($\alpha$2) is approximately 32 degrees and formed between the first contact surface 1447 of the sole 1448 and the second contact surface 1448 of the toe 1444. The foot 1442 thus includes two flat or generally flat separate contact surfaces 1446 and 1448 that function for different purposes as described below.

In the illustrated example dosing lever 1400, the different beveled portions of the body 1410 define sloped surfaces of the fuel cell door facing section 1414. More specifically, the first beveled portion 1422 includes a substantially rectangular surface 1471 defined by: (1) a first edge 1472; (2) a second edge 1473 opposite the first edge 1472; (3) a third edge 1474 connecting the first edge 1472 and the second edge 1473; and (4) a fourth edge 1475 opposite the third edge 1474 and connecting the first edge 1472 and the second edge 1473.

The second beveled portion 1424 includes a substantially trapezoidal surface 1476 defined by: (1) the third edge 1474; (2) a fifth edge 1477 opposite the third edge 1474; (3) a sixth edge 1478 connecting the third edge 1474 and the fifth edge 1477; and (4) a seventh edge 1479 opposite the sixth edge 1478 and connecting the third edge 1474 and the fifth edge 1477.

The third beveled portion 1426 includes a substantially trapezoidal surface 1480 defined by: (1) the fourth edge 1475; (2) an eighth edge 1481 opposite the fourth edge 1475; (3) a ninth edge 1482 connecting the fourth edge 1475 and the eighth edge 1481; and (4) a tenth edge 1483 opposite the ninth edge 1482 and connecting the fourth edge 1475 and the eighth edge 1481.

In the illustrated example embodiment, the rectangular surface 1471 is a downwardly sloping surface that extends downward from the first edge 1472 to the second edge 1473 of the first beveled portion 1422. The trapezoidal surface 1476 is defined at one end of the rectangular surface 1471. The trapezoidal surface 1476 is a downwardly sloping surface that extends downward from the third edge 1474 to the fifth edge 1477 of the second beveled portion 1424. The trapezoidal surface 1480 is defined at the other end of the rectangular surface 1471. The trapezoidal surface 1480 is a downwardly sloping surface that extends downward from the fourth edge 1475 towards the tenth edge 1483.

In the illustrated example embodiment, the downwardly sloping surfaces of the rectangular surface 1471, the trapezoidal surface 1476, and the trapezoidal surface 1480 reduce a height or thickness of the fuel cell door facing section 1414 of the body 1410 (as compared to the known dosing lever described above). As discussed in more detail below, the beveled portions 1422, 1424, and 1426 are configured such that the body 1410 of the dosing lever 1400 does not engage or otherwise contact the fuel cell door 1310 during actuation of the dosing lever 1400.

Figure 11:
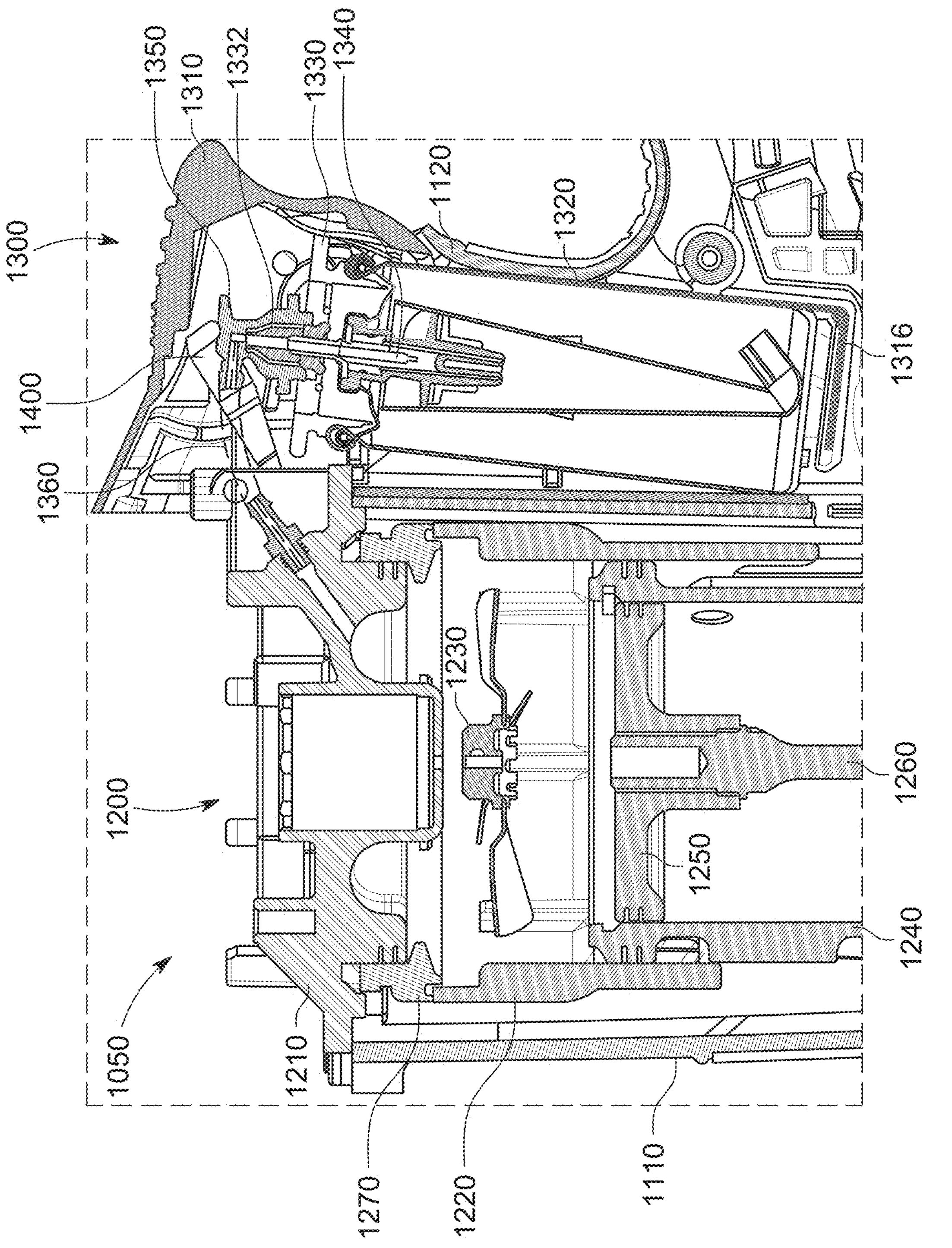
FIG. 11 is an enlarged fragmentary cross-sectional view of part of the fastener driving tool of FIG. 5, showing part of the fastener driving assembly, and showing the fuel supply assembly including the dosing lever of FIG. 6 mounted in the housing.

As best shown in FIG. 11, the dosing lever 1400 engages the fuel cell receiving block 1350 to dispense a dose of fuel from the fuel cell 1320. The fuel cell receiving block 1350 is mounted on and connected to a valve stem 1332 of the fuel cell adapter 1330. The fuel cell receiving block 1350 includes an internal fuel passageway (not labeled) aligned with an internal fuel passageway (not labeled) of the valve stem 1332 to fluidly couple the fuel cell 1320 to the fuel cell receiving block 1350.

In the illustrated example embodiment, the dosing lever 1400 is engaged to the fuel cell receiving block 1350 and actuation of the dosing lever 1400 transfers axial force from the dosing lever 1400 to the fuel cell receiving block 1350. More specifically, actuation of the dosing lever 1400 causes the fuel block contact section 1416 to move downward and engage the fuel cell receiving block 1350. This downward movement of the fuel cell receiving block 1350 causes a corresponding downward movement of the valve stem 1332 of the fuel cell adapter 1330 and the fuel cell metering valve 1340. As the fuel cell metering valve 1340 moves downward, the valve draws a fuel dose from the fuel cell 1320 into the fuel cell metering valve 1340. Non-actuation of the dosing lever 1400 causes an upward movement of the fuel block contact section 1416 and a corresponding upward movement of the fuel cell receiving block 1350. This upward movement of the fuel cell receiving block 1350 causes a corresponding upward movement of the valve stem 1332 and the fuel cell metering valve 1340. As the fuel cell metering valve 1340 moves upward, the valve dispenses the fuel dose from the fuel cell 1320 into the combustion chamber 1220.

Figure 12:
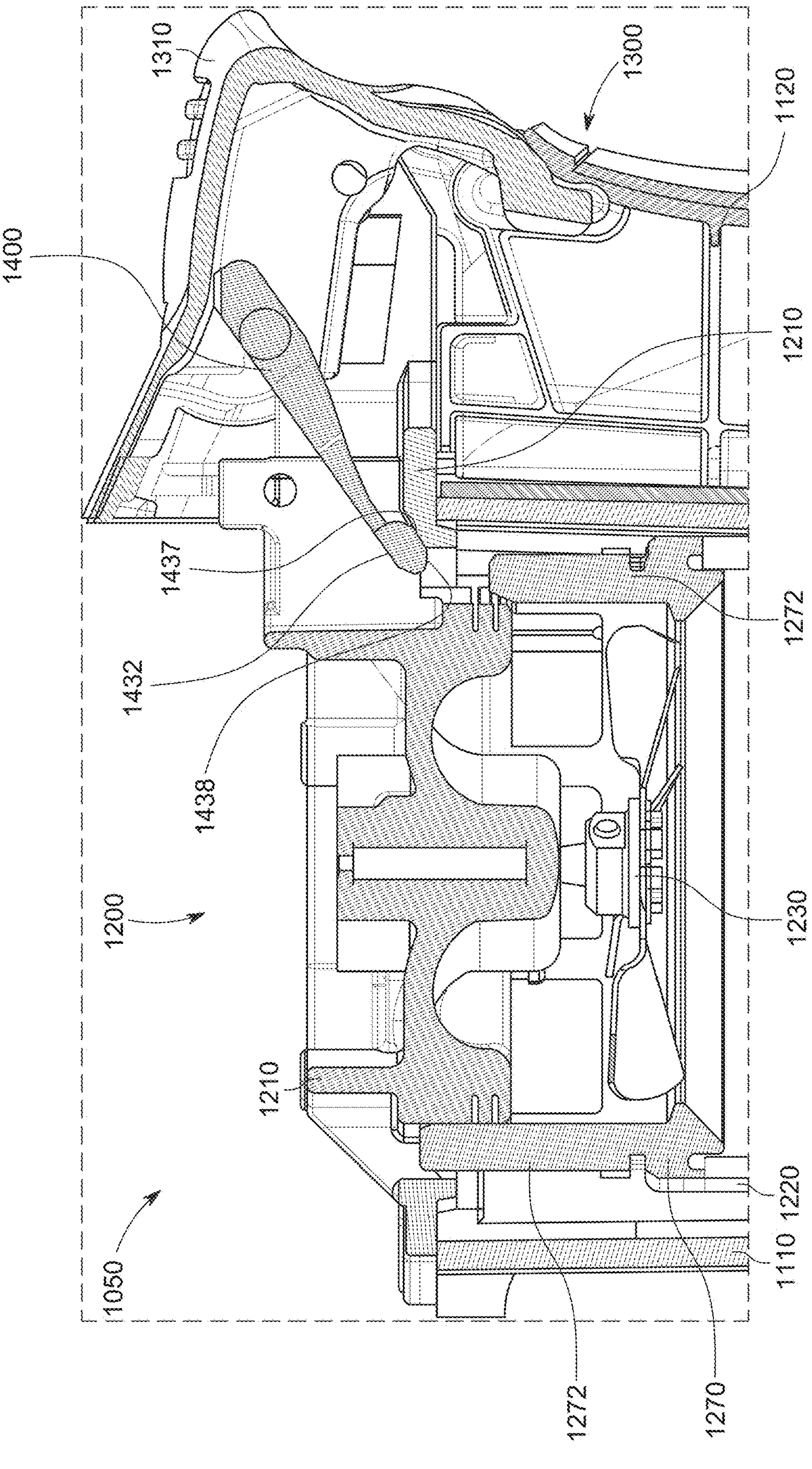
FIG. 12 is an enlarged fragmentary cross-sectional view of part of the fastener driving tool of FIG. 5, showing the dosing lever of FIG. 6 in the non-actuated position, and showing the dosing lever engaged with the cylinder head.
Figure 13:
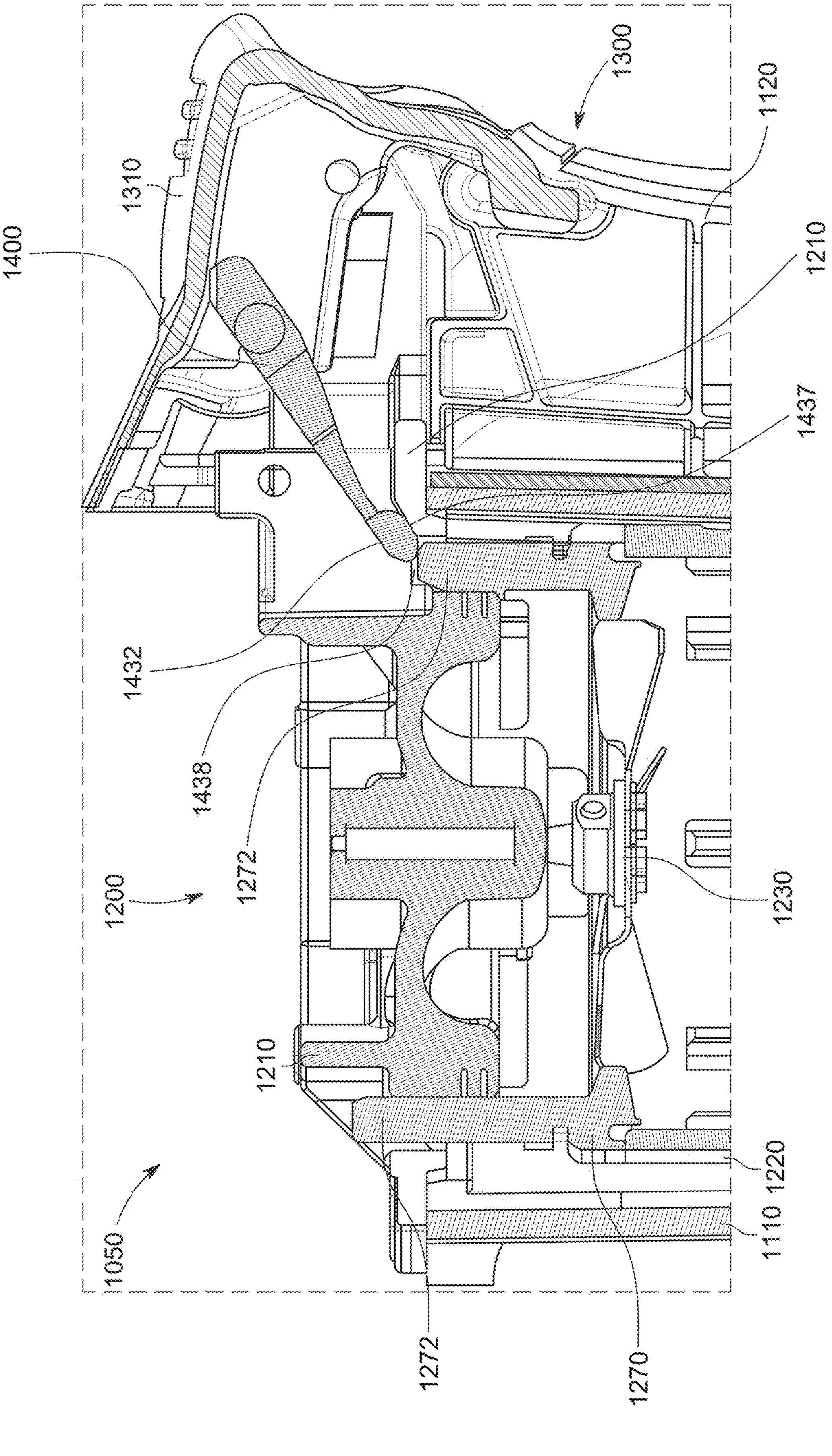
FIG. 13 is an enlarged fragmentary cross-sectional view of part of the fastener driving tool of FIG. 5, showing the dosing lever in the partial actuated position, and showing the dosing lever engaged by with cylinder head and by the combustion chamber ring.
Figure 14:
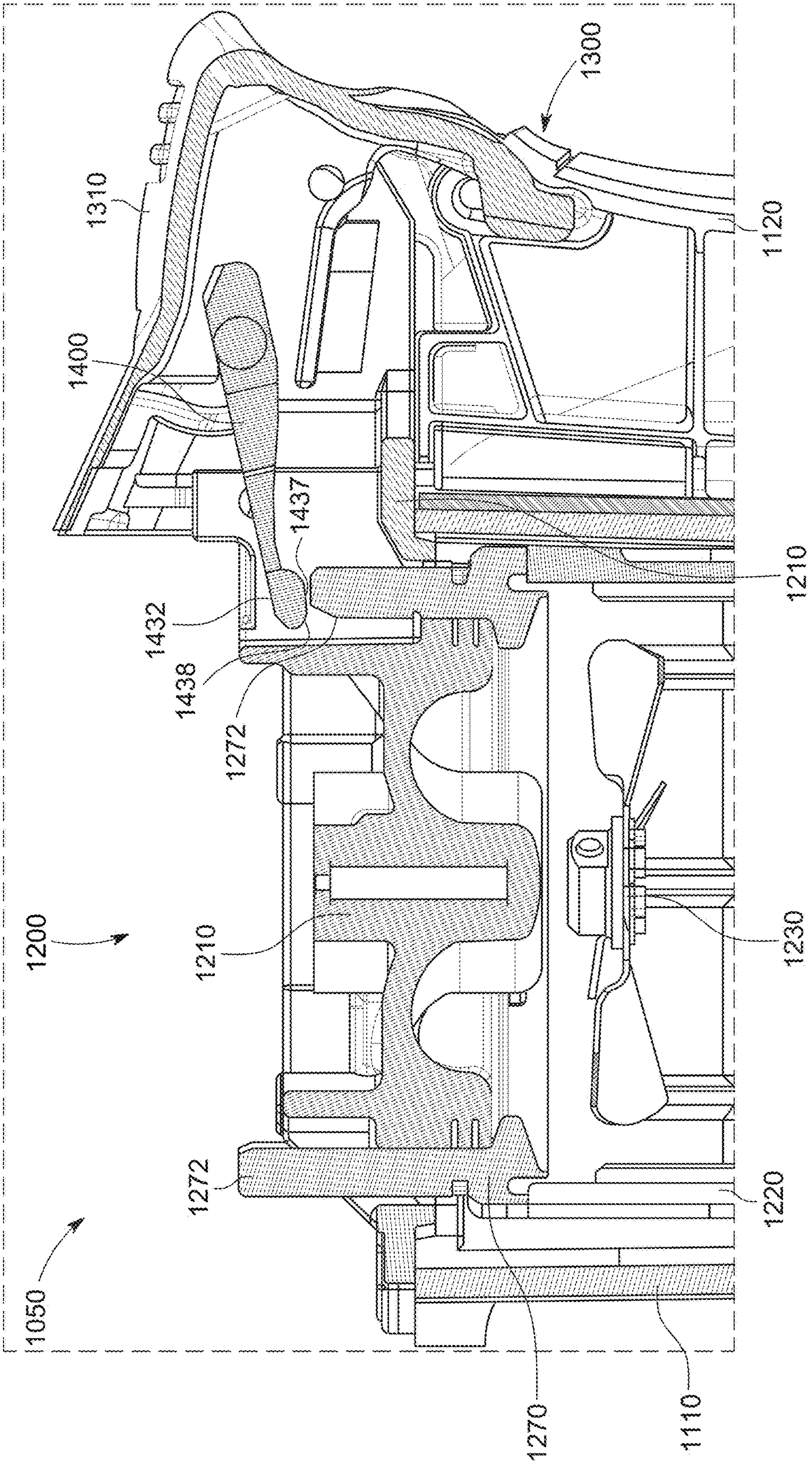
FIG. 14 is an enlarged fragmentary side cross-sectional view of part of the fastener driving tool of FIG. 5, showing the dosing lever of FIG. 6 in the actuated position, and showing the dosing lever engaged by the combustion chamber ring.

Part of the operation of the example fastener driving tool 1050 is also partially shown in FIGS. 11 to 14. In the illustrated example embodiment, the fastener driving tool 1050 is configured to sequentially drive a plurality of fasteners (not shown) into a workpiece. Prior to actuation of the tool 1050, the dosing lever 1400 is in a non-actuated position. As best shown in FIGS. 12, 13, and 14, the combustion chamber ring 1270 includes a plurality of ring fingers 1272 configured to selectively engage the feet 1432 and 1442 of the first and second legs 1430 and 1440, respectively. As shown in FIG. 12, when the dosing lever 1400 is in the non-actuated position, the combustion chamber ring 1270 is in the non-actuated position and the plurality of ring fingers 1272 are in a non-engaged position with respect to the feet 1432 and 1442 of the dosing lever 1400.

In the illustrated example embodiment, when the dosing lever 1400 is in the non-actuated position, the dosing lever 1400 is pivoted about the first and second lever pivot pins 1450 and 1460 such that the first and second dosing lever legs 1430 and 1440 angle downward towards the combustion chamber ring 1270 and the body 1410 angles upward towards the fuel cell door 1310. More specifically, when the dosing lever 1400 is in the non-actuated position, the first contact surfaces 1437 and 1447 of feet 1432 and 1442 are engaged to and supported by the cylinder head 1210 and the beveled portions 1422, 1424, and 1426 of the fuel cell door facing section 1414 are adjacent the fuel cell door 1310. The beveled portions 1422, 1424, and 1426 are configured such that the body 1410 of the dosing lever 1400 does not contact or otherwise engage the fuel cell door 1310 when the dosing lever 1400 is in the non-actuated position. In other words, the beveled portions 1422, 1424, and 1426 define a gap between the fuel cell door facing section 1414 of the body 1410 and the inner surface of the fuel cell door 1310 when the dosing lever 1400 is in the non-actuated position.

When the operator is ready to actuate the tool 1050, the operator can cause the compression of the workpiece contact element 1710 against a workpiece (not shown). This compression of the workpiece contact element 1710 causes the combustion chamber ring 1270 to move axially upwardly which causes the dosing lever 1400 to pivot which causes the fuel cell receiving block 1350 to push on the adapter 1330 and causes the adapter 1330 to push on the fuel cell metering valve 1340 to cause a release of a dose of fuel from the fuel cell into the closed combustion chamber. At that point, subsequent compression of the trigger 1530 that causes a spark in the closed combustion chamber can ignite the dose of fuel in the combustion chamber and drive the fastener (not shown) into the workpiece. Thus, as best shown in FIGS. 13 and 14, engaging the workpiece contact element 1710 from the workpiece closes the combustion chamber and causes movement of the combustion chamber ring 1270, and the plurality of ring fingers 1272, in an axially upward direction towards the housing cap 1130. After driving the fastener into the workpiece, disengagement of the workpiece contact element 1710 from the workpiece causes the combustion chamber to open and causes the downward axial movement of the combustion chamber ring 1270 (including its plurality of fingers 1272) and thus disengagement of the dosing lever 1400. This disengagement of the dosing lever 1400 causes the dosing lever 1400 to pivot downwardly to be in a position ready for the next actuation of the workpiece contact element 1710 and thus for the next combustion cycle of the tool 1050.

In the illustrated example embodiment, engagement between the combustion chamber ring fingers 1272 and the dosing lever feet 1432 and 1442 causes the dosing lever 1400 to pivot about the first and second lever pivot pins 1450 and 1460 from the non-actuated position into the actuated position. More specifically, when the dosing lever 1400 pivots between the non-actuated position to the actuated position, the ring fingers 1272 engage the respective second contact surfaces 1438 and 1448 of feet 1432 and 1442. As such, the second contact surfaces 1438 and 1448 slide along the outer surface of the ring fingers 1272 and the first contact surfaces 1437 and 1447 slide along the outer surface of the cylinder head 1210. As best shown in FIG. 14, when the dosing lever 1400 is in its fully actuated position, the second contact surfaces 1438 and 1448 are engaged with and supported by the ring fingers 1272.

In the illustrated example embodiment, as the combustion chamber ring moves the dosing lever 1400 between the non-actuated and actuated position the first contact surfaces 1437 and 1447 and second contact surfaces 1438 and 1448 of the feet 1432 and 1442 are configured to slide smoothly along the ring fingers 1272. This engagement between the ring fingers 1272 and the feet 1432 and 1442 causes a consistent and repeatable actuation of the dosing lever 1400, which in turn causes the fuel supply assembly 1300 to deliver a consistent and repeatable dose of fuel from the fuel cell 1320 to the combustion chamber 1220 even in circumstances of extremely cold weather.

In the illustrated example embodiment, actuation of the dosing lever 1400 also causes downward movement of the body 1410 from the fuel cell door 1310 towards the fuel cell 1320. This downward movement of the body 1410 causes depression of the fuel cell receiving block 1350, the valve stem 1332, and the fuel cell metering valve 1340. As such, the fuel cell metering valve 1340 draws a dose of fuel from the fuel cell 1320 for delivery to the combustion chamber 1220. The first contact surfaces 1437 and 1447 and second contact surfaces 1438 and 1448 of the feet 1432 and 1442 are configured to slide smoothly along the ring fingers 1272 as the combustion chamber ring moves the dosing lever 1400 between the non-actuated and actuated position. This engagement between the ring fingers 1272 and the feet 1432 and 1442 causes a consistent and repeatable actuation of the dosing lever 1400, which in turn causes the fuel supply assembly 1300 to deliver a consistent and repeatable dose of fuel from the fuel cell 1320 to the combustion chamber 1220.

In the illustrated example embodiment, as the dosing lever 1400 moves between the non-actuated position (αs shown in FIG. 12) and the actuated position (αs shown in FIG. 14), the interaction between the dosing lever 1400 and the fuel cell receiving block 1350 causes the fuel metering valve to draw a dose of fuel from the fuel cell 1320. In the illustrated example embodiment, the beveled portions 1422, 1424, and 1426 of the fuel cell door facing section 1414 of the body 1410 are configured to form a gap between the body 1410 and the inner surface of the fuel cell door 1310. Accordingly, the beveled portions 1422, 1424, and 1426 of the dosing lever 1400 ensure that the dosing lever 1400 can fully pivot between the non-actuated position and the actuated position without contacting the inner surface of the fuel cell door 1310. As such, each actuation cycle of the dosing lever 1400 delivers a consistent and repeatable amount of fuel from the fuel cell 1320 to the combustion chamber 1220 even in circumstances of extremely cold weather.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A fastener driving tool dosing lever for a fastener driving tool, the fastener driving tool dosing lever comprising:

a body including a first leg connection section, a second leg connection section, a fuel cell door facing section including a first beveled portion, a second beveled portion, a third beveled portion, and an upright portion that connects the fuel cell door facing section to a fuel block contact section, and the fuel block contact section engageable with a fuel cell receiving block of the fastener driving tool upon actuation of the dosing lever, wherein the first beveled portion, the second beveled portion, and the third beveled portion are non-coplanar;

a first leg connected to and extending from the body, the first leg including a connection portion connected to the first leg connection section of the body, a first foot opposite the connection portion of the first leg, and a central portion extending between and connected to the connection portion of the first leg and the first foot, the first foot including a toe, a heel, and a sole extending between and connected to the toe and the heel, the sole including a first contact surface of the first foot, the toe including a sloped surface with respect to the sole that defines a second contact surface of the first foot;

a second leg connected to and extending from the body, the second leg including a connection portion connected to the second leg connection section of the body, a second foot opposite the connection portion of the second leg, and a central portion extending between and connected to the connection portion of the second leg and the second foot, the second foot including a toe, a heel, and a sole extending between and connected to the toe and the heel, the sole including a first contact surface of the second foot, the toe including a sloped surface with respect to the sole that defines a second contact surface of the second foot;

a first lever pivot pin connected to and extending from the first leg; and a second lever pivot pin connected to and extending from the second leg.

2. The fastener driving tool dosing lever of claim 1, wherein the first contact surface of the first foot extends at about a 32 degree angle from the second contact surface of the first foot, and wherein the first contact surface of the second foot extends at about a 32 degree angle from the second contact surface of the second foot.

3. The fastener driving tool dosing lever of claim 1, wherein the first beveled portion defines a downward sloping rectangular surface, the second beveled portion defines a downward sloping first trapezoidal surface, and the third beveled portion defines a downward sloping second trapezoidal surface.

4. The fastener driving tool dosing lever of claim 3, wherein the downward sloping rectangular surface, the downward sloping first trapezoidal surface, and downward sloping second trapezoidal surface form a reduced thickness of the fuel cell door facing section such that the body of the dosing lever does not engage a fuel cell door of the fuel supply assembly during actuation of the dosing lever.

5. The fastener driving tool dosing lever of claim 4, wherein the first contact surface of the first foot extends at about a 32 degree angle from the second contact surface of the first foot, and wherein the first contact surface of the second foot extends at about a 32 degree angle from the second contact surface of the second foot.

* * * * *